United States Patent [19]

Suggitt et al.

[11] 4,415,478

[45] Nov. 15, 1983

[54] LOW HALIDE ACTIVATED AGGLOMERATED CARBON CATALYSTS

[75] Inventors: Robert M. Suggitt, Wappingers Falls; Joseph H. Coone, Jr., Fishkill; Walter C. Gates, Jr., Carmel, all of N.Y.

[73] Assignee: Texaco, Inc., White Plains, N.Y.

[21] Appl. No.: 304,231

[22] Filed: Sep. 21, 1981

Related U.S. Application Data

[63] Continuation-in-part of Ser. No. 754,394, Dec. 27, 1976, abandoned.

[51] Int. Cl.³ .................. B01J 21/18; C01B 31/08; B01J 20/20; B01J 23/40
[52] U.S. Cl. .................................. 502/181; 423/461
[58] Field of Search ............... 423/460, 461; 252/444, 252/447, 422; 264/29.1, 29.3

[56] References Cited

U.S. PATENT DOCUMENTS

| | | | |
|---|---|---|---|
| 1,502,896 | 7/1924 | Barneby | 252/421 |
| 1,803,943 | 5/1931 | Miller | 252/444 |
| 2,599,089 | 6/1952 | Castle et al. | 585/357 |
| 2,837,412 | 6/1958 | Bennett | 423/460 |
| 3,073,865 | 1/1963 | Spiegler | 252/447 |
| 3,127,356 | 3/1964 | Hamilton, Jr. et al. | 252/444 |
| 3,168,485 | 2/1965 | Knobloch | 252/444 |
| 3,183,278 | 5/1965 | Koch, Jr. et al. | 585/268 |
| 3,501,272 | 3/1970 | Benak | 423/461 |
| 3,542,863 | 11/1970 | Zimmerschied | 252/447 |
| 4,066,699 | 6/1978 | Suggitt et al. | 252/447 |

FOREIGN PATENT DOCUMENTS

| | | | |
|---|---|---|---|
| 47-35674 | 7/1972 | Japan | 423/461 |
| 577862 | 6/1946 | United Kingdom | 252/447 |

Primary Examiner—P. E. Konopka
Attorney, Agent, or Firm—Carl G. Ries; Robert A. Kulason; Carl G. Seutter

[57] ABSTRACT

Activated agglomerated carbon may be prepared by leaching with a hydrohalic acid followed by displacement of the residual halide with organic carboxylate during subsequent washing with a water-soluble organic carboxylic acid or a water-soluble ammonium salt of an organic carboxylic acid.

8 Claims, No Drawings

LOW HALIDE ACTIVATED AGGLOMERATED CARBON CATALYSTS

RELATED APPLICATION

This application is a continuation-in-part of application Ser. No. 754,394 filed Dec. 27, 1976, now abandoned, by the same inventors.

BACKGROUND OF THE INVENTION

This invention relates to novel activated carbon agglomerates. More particularly it relates to a novel reduced ash activated carbon agglomerate particularly characterized by low halide content.

As is well known to those skilled in the art, carbon is used as a catalyst, a catalyst component, or a catalyst support in a wide variety of catalyst compositions. Typical of such catalyst compositions are those wherein activated carbon is used as a support on which is deposited a noble metal such as platinum.

It is an object of this invention to provide a novel low halide activated agglomerated carbon catalyst. It is another object of this invention to provide a process for treating a carbon agglomerate to reduce the halide content. Other objects will be apparent to those skilled in the art from inspection of the following description.

STATEMENT OF THE INVENTION

In accordance with certain of its aspects, the method of this invention for preparing a reduced ash carbon agglomerate may comprise leaching a high ash carbon agglomerate in contact with a hydrohalic acid thereby forming a reduced ash carbon agglomerate containing halide values;

leaching said reduced ash carbon agglomerate in contact with a solution containing at least one composition selected from the group consisting of water-soluble organic carboxylic acid and ammonium salts thereof, thereby forming a reduced ash carbon agglomerate containing decreased halide values; and recovering said reduced ash carbon agglomerate containing decreased halide values.

DETAILED DESCRIPTION OF THE INVENTION

The charge activated carbon agglomerate which may be treated by the process of this invention may be of animal, vegetable, or mineral (including chemical) origin. Activated carbon agglomerates may be prepared from a wide variety of plentiful materials. Among the more widely used are wood, sawdust, peat, pulp-waste, vegetable waste, bone, and blood. All of these precursors contain non-carbon materials that form an ash on combustion. The amount of ash can vary extensively—ranging from 2% for coconut-derived carbon or 3% or more for wood ash carbon to over 20% for bone char. Typically the ash content of a lignite derived carbon may be 15%.

It is customary when it is desired to prepare carbon agglomerates, to incorporate mineral elements into the composition to facilitate the subsequent activation and the development of mechanical strength of the shaped aggregates. Typically zinc chloride has been added to carbonaceous materials such as sawdust, to promote their response to activation treatments. Phosphoric acid, sodium phosphate, and dolomite (a calcium magnesium carbonate) are also used.

The preparation of activated carbon agglomerates includes the formation of such a mix into shaped aggregates followed by a carbonization of the shaped aggregate in the absence of air at temperatures below 1200° F. After carbonization, the agglomerated carbon is then activated by a controlled oxidation using eg steam or carbon dioxide at 1400°–1700° F. or air at 600° F.–1100° F. The oxidizing gases remove any residual hydrocarbons and form a carbon having a high surface area.

However, the mineral matter which is present in the organic precursor (including its inorganic components) and in the chemicals used to promote activation generally remain with the carbon and are commonly referred to as ash. This mineral matter can be deleterious to catalyst performance. Various shaped activated carbons prepared from vegetable, coal, and petroleum coke are available that contain up to 10 percent mineral material or more.

Analyses of the ash component reveal a wide variety of elements depending on the source of the carbon and the agents used to promote activation and agglomerate strength. Elements commonly found in activated agglomerated carbons (aside from carbon) include silicon, aluminum, iron, calcium, sodium, potassium, magnesium, titanium, phosphorus, and sulfur.

The presence of these inorganic materials in the activated carbon can be deleterious to a catalyst prepared from the carbon in a number of ways.

Some of these materials, e.g., sulfur or phosphorus, can act as a poison for sensitive catalytic agents such as rhodium or platinum when the catalyst is used to hydrogenate aromatics to the corresponding naphthenes. Other materials, when present in moderate amounts, can promote unwanted side reactions that create impurities in the naphthene product. For example alumina (at higher operating temperatures e.g. 600+° F.) can promote isomerization and hydrocracking. In the hydrogenation of benzene, non-moderated alumina can promote formation of methyl-cyclopentane and other undesired hexanes and thus contaminate the cyclohexane product.

Furthermore polar impurities in the activated agglomerated catalyst (e.g., calcium carbonate, silica, etc.) tend to sort out the platinum or rhodium complex from the impregnating solution and thus nullify to an extent the advantage of high surface area that the activated carbon possesses. That is, rather than be distributed over the large area of carbon surface, the platinum or rhodium is agglomerated on the low area inorganic material.

The presence of inorganic material also alters the sorption characteristics of the carbon. Thus water sorption can be increased and pores become clogged with attendant loss in catalytic activity.

Various carbon purification processes have been advanced such as vapor phase treatments with chlorine, water washing, and acid washing. U.S. Pat. No. 3,501,272 for example teaches that immersing the carbon in a mixture of concentrated hydrofluoric acid and nitric acid followed by treatment in boiling aqueous hydrochloric acid will purify carbon.

The high ash carbons in the form of agglomerates which may be treated by the process of this invention may typically be characterized by their total ash content of up to 20%, typically 0.1%–15%, say 7–8%, by their $SiO_2$ content of 2%–10%, typically 5.4%–8%, say 7.7%, and by their crush strength (after drying overnight at 300° F.) of 10–25, typically 15–25, say 22 pounds (corresponding to 0.8–4, typically 1–6 say 3.3 pounds per millimeter length)—when measured on a typical cylindrical agglomerate having a diameter of 3 mm, a length of ca 7 mm, and a density of 0.43–0.47 g/cc.

Illustrative commercially available charge carbon agglomerates which may be employed may include that sold by American Norit Co. under the trademark Norit R 3250 of irregular shape having an average diameter of about 3 mm, apparent density of about 0.47 g/cc, nonvolatile ash of about 4.3% (after calcination), silica content of about 2.15%, and a crush strength of about 3.3 pounds per millimeter of length.

In practice of the process of this invention, the high ash carbon agglomerate is first contacted with a hydrohalic acid, preferably in aqueous solution. It may be possible to use (i) aqueous hydrochloric acid, (ii) aqueous hydrofluoric acid, (iii) aqueous hydrobromic acid, (iv) aqueous hydroiodic acid, or (v) an aqueous mixture of two or more hydrohalic acids e.g., of hydrochloric acid and hydrofloric acid, etc.; it is however highly preferred that in the first leaching operation, the agent be aqueous hydrochloric acid. It is also preferred that leaching with aqueous hydrochloric acid be followed by leaching with aqueous hydrofluoric acid—prior to further treating in practice of the process of this invention.

In practice of the process of this invention in accordance with certain of its preferred aspects, the high ash, carbon agglomerate charge (typically having say 7.7% ash) is first leached with hydrochloric acid in a first leaching operation. Preferably the acid may be 3%–35%, typically 10%–25%, say 20% aqueous hydrochloric acid, leaching may be effected by use of acid in total amount, in one or more stages, of 0.1–10, preferably 0.5–3, say 1 times the weight of carbon charge in each stage. Leaching with hydrochloric acid may typically be effected for 1–144 hours, preferably 8–96 hours, say 72 hours at 100° F.–250° F., typically 130° F.–140° F., say 135° F. at 0–500 psig, typically 0–100 psig, say 0 psig. (The solution used in the leaching operations may consist essentially of aqueous hydrochloric acid and be essentially free of other components including other acids such as hydrofluoric acid, nitric acid, sulfuric acid, etc.).

Preferably the carbon is water washed with an excess of water after each leaching with hydrochloric acid.

Optionally the carbon agglomerate may be acid washed in at least one additional stage using hydrochloric acid under preferably the same conditions as those used in the first washing. At the conclusion of the wash with hydrochloric acid, the ash content may typically be 1%–15%, 1%–10% say 1.3%; and the ash will contain mostly silica with only minor amounts of iron, phosphate, magnesium, and calcium. The silica content may be typically 1–9%, preferably 1%–6%, say about 1.1%. The typical strength (pounds per mm length) may be 0.8–6, commonly 1–4, say 3.1. The wash with hydrochloric acid will have removed most of the non-silica ash constituents. The crush strength will be substantially the same as that of the charge.

The reduced ash carbon agglomerate as so prepared may in accordance with the preferred aspect of this invention be leached with hydrofluoric acid. Preferably the acid may be 2%–50%, typically 5%–30% say 10% aqueous hydrofluoric acid. Leaching may be effected by use of acid in total amount, in one or more stages, of 0.02–10, preferably 0.1–1, say 0.2 times the weight of carbon charge in each stage. Leaching with hydrofluoric acid may typically be effected for 1–144 hours, preferably 8–72 hours, say 48 hours at 100° F.–210° F., typically 130° F.–140° F., say 135° F. at 0–500 psig, typically 0–100 psig, say 0 psig. The preferred leaching solution in this second leaching operation may consist essentially of aqueous hydrofluoric acid and be essentially free of other components including other acids such as hydrochloric acid, nitric acid, sulfuric acid, etc.

In one preferred embodiment, the leaching with hydrochloric acid and the leaching with hydrofluoric acid may each be separately carried out in a single separate step. In another preferred embodiment, each of the leachings may be carried out in several steps. Thus the charge high ash carbon may be leached 2–5 times with hydrochloric acid to yield the reduced ash carbon and then subsequently leached 2–5 times with hydrofluoric acid. Preferably one or more water washes may follow each of the acid washes.

The HF-washed carbon agglomerate may contain less than 0.1% total ash, commonly 0.05%–0.1%. The silica content is of the same order of magnitude i.e. less than 0.1%; commonly 0.05%–0.1%. The ash may typically consist essentially of silica. The halide ion content is 0.1%–5%, say 0.4%. The strength (pounds per mm of length) may be 0.8–6, commonly 1–6, say 3.1.

At the conclusion of the leaching with hydrohalic acid, it is preferred that the low ash carbon be treated to lower the halide from its value of 0.1%–5%, preferably 0.1%–2%, say 0.40% to a final value of 0.01%–0.5%, preferably 0.01%–0.2%, say 0.03%.

This may preferably be effected by leaching with an organic acid and preferably a water-soluble organic carboxylic acid such as acetic acid, propionic acid, formic acid, butyric acid (the latter being less preferred because of lower solubility and higher boiling point), etc. The preferred acid is acetic acid in 1%–50%, preferably 10%–30%, say 20% aqueous solution.

Lowering of the halide may also be effected by leaching with an ammonium salt of an organic acid, preferably a carboxylic acid. The ammonium salts may include quaternary ammonium salts. Illustrative ammonium salts may include:

ammonium benzoate
ammonium formate
ammonium acetate
ammonium carbamate
ammonium lactate
ammonium citrate
ammonium oxalate
ammonium propionate
ammonium salicylate
ammonium succinate
ammonium tartrate
ammonium valerate It should be noted that carbamic acid or carbonic acid are used in the form of their ammonium salts. (not as the free acids).

Illustrative quarternary ammonium salts may include:
tetramethyl ammonium acetate
benzyl, trimethyl ammonium acetate
tetramethyl ammonium formate
tetra-ethyl ammonium citrate etc.

Treatment with the acetic acid, in the preferred embodiment, may be effected by contacting the low ash carbon agglomerate with 0.5–50 times, preferably 1–10, say about five times its weight of acetic acid for 0.3–72, preferably 1–10, say 5 hours at 60° F.–200° F., preferably 130° F.–140° F., say 135° F. and 0–500 psig, preferably 0-100 psig, say 0 psig. Leaching with acetic acid may be effected in one or more steps to yield a low ash carbon containing reduced halide values.

At the conclusion of the wash with the preferred 20% acetic acid, the ash content of the low ash carbon agglomerate may be typically less than 0.1 wt %. Generally the acetic acid treatment will have little or no measurable effect on the total ash or silica content. The halide content is preferably less than 0.5%; and it may be 0.01-0.5%, preferably 0.01%-0.2%, say 0.03%. The strength of the agglomerate is typically unaffected by acetic acid treating. The crush strength of the agglomerate is commonly substantially the same as it was prior to treating with hydrochloric acid.

The preferred of these materials may be ammonium acetate and more preferably acetic acid—in aqueous solution.

The carbon agglomerate may be dried at 100° F.-1000° F., preferably 180° F., say 230° F. for 2-24 hours, preferably 6-10 hours, may 8 hours and then cooled to ambient temperature of 50° F.-100° F., preferably 65° F.-90° F., say 70° F.

It is a particular feature of the carbon agglomerate so prepared that it is of controlled composition which is normally constant and which is particularly characterized inter alia by its controlled low ash content and its controlled low content of fixed, non-volatile halides such as sodium chloride, calcium chloride, magnesium chloride, etc.

In practice of the preferred aspect of this invention, a catalyst composition particularly characterized by its ability to efficiently catalyze hydrogenation reactions may be prepared by depositing a Group VIII metal preferably selected from the group consisting of platinum, palladium, and rhodium onto an agglomerated carbon catalyst support having preferably a halide content of less than about 0.5% and an ash content of less than about 0.1% of non-volatile ash. The preferred low ash carbon which may be employed may be that prepared by the process disclosed supra.

In accordance with this aspect of the invention, the catalyst may be prepared by impregnating the carbon, preferably in the form of low halide low ash agglomerates, with (typically by immersion in) a solution of a Group VIII metal preferably selected from the group consisting of platinum, palladium, ruthenium and rhodium. Other metals of Group VIII may be employed including nickel, cobalt, etc.

Platinum may be deposited on the catalyst support from a solution containing 0.2-50, preferably 6-20, say 10 parts of platinum per 1000 parts of solution prepared by neutralizing an aqueous solution of chloroplatinic acid with ammonium hydroxide and continuing addition of the latter until a clear solution of the amine complex is obtained. A small amount of methyl alcohol may be added to the solution.

Rhodium may be deposited on the catalyst support from a solution containing 0.2-50, preferably 6-20, say 10 parts of rhodium per 1000 parts of solution prepared by reacting a solution of rhodium chloride in methanol with an excess of ammonium hydroxide to form a clear solution of the rhodium amine complex in methanol. Palladium may be impregnated by use of a solution of the nitrate salt—the solution containing 0.2-50 parts, preferably 0.6-20, say 1 part of palladium per 1000 parts of total solution.

The catalyst support may remain in contact with the rhodium or platinum or palladium solution for 1-24 hours, preferably 1-8 hours, say 1.5 hours at 50° F.-122° F., preferably 66° F.-86° F., say 77° F. The support particles which adsorb solution during this period may be separated and dried at 200° F.-400° F., preferably 220° F.-360° F., say 300° F. for 4-24 hours, preferably 6-10 hours, say 8 hours in a nonoxidizing atmosphere such as nitrogen. The catalyst particles may be calcined at 700° F.-1200° F., say 900° F. for 1-4 hours, preferably 1-3 hours, say 1 hour in an inert atmosphere such as nitrogen or hydrogen.

The loaded catalyst agglomerate composition so-prepared may thus comprise a catalyst support having an ash content of less than about 0.1% of non-volatile ash; and supported thereon at least one Group VIII metal preferably selected from the group consisting of platinum, palladium and rhodium. It may contain platinum, rhodium, and palladium.

The preferred product catalyst agglomerate compositions of this invention may contain platinum in amount of 0.2%-5%, preferably 0.2%-2%, say about 1%, rhodium in amount of 0.2%-5%, preferably 0.2%-2%, say about 1% by weight of the total, or palladium in amount of 0.2-5%, say 1%.

Illustrative of the product catalysts so prepared may be (a) a wood derived carbon agglomerate (orginally containing 7.7% total ash and 5% silica) treated by the process of this invention to yield a carbon containing about 0.03% halide, less than 0.1% total ash, and less than 0.05% silica on which has been deposited 1.09% platinum (crush stregth of ca 3.1 #/mm length and halogen content of about 0.1%);

(b) a bone derived carbon agglomerate (orginally containing 15% total ash and 5% silica) treated by the process of this invention to yield a carbon containing about 0.5% halide, 0.07% total ash, and ca 0.04% silica on which has been deposited 0.85% pltinum (crush strength of ca 2.6 #/mm length and halogen content of about 0.01%);

(c) a petroleum (from petroleum coke) derived carbon agglomerate (orginally containing 2.5% total ash and 0.5% silica) treated by the process of this invention to yield a carbon containing 0.01% halide, 0.1% total ash, and 0.01% silica on which has been deposited about 1% rhodium (crush strength of ca 3.5 #/mm length and halogen content of about 0.03%).

It is a particular feature of the process of this invention that the novel catalyst may be employed in a wide variety of dehydrogenation or hydrogenation reactions including the hydrogenation of aromatics to naphthenes, hydrogenation of unsaturated paraffins to saturated paraffins, hydrogenation of ketones to secondary alcohols, hydrogenation of aldehydes to primary alcohols, dehydrogenation of naphthenes to aromatics, etc. It is particularly useful in connection with the hydrogenation of benzenes to cyclohexanes.

During the course of carrying out the hydrogenation of aromatics, such as benzene, to the corresponding naphthene, typically cyclohexane, the typical platinum or rhodium catalyst may normally be pretreated by heating in the presence of hydrogen for 2-24 hours, preferably 4-20 hours, say 16 hours at 572° F.-1022° F., preferably 750° F.-932° F., say 860° F.

The charge to hydrogenation may comprise an aromatic including benzenes such as benzene se, toluene, ethylbenzene, cyclohexyl benzene, etc. Preferably hydrogenation may be effected in vapor phase by passing the charge hydrocarbon and hydrogen into contact with the catalyst at pressure of 0–1000 psig, preferably 500–600 psig, say 500 psig.

The temperature of the charge to hydrogenation may be 180° F.–650° F., preferably 200° F.–400° F., say 300° F., and this may correspond to a maximum temperature within the catalyst bed of 500° F.–700° F., preferably 500° F.–610° F., say about 570° F.

Hydrogenation may typically be effected at an LHSV of 0.1–4, preferably 1–2, say 1.5 with mole ratio of hydrogen to benzene of 4–12, preferably 5–9 say 7. Hydrogenation may be carried out in the presence of inert diluent, preferably product cyclohexane; and the volumetric ratio of cyclohexane to benzene in the charge may be 2–6:1, say 3:1.

During hydrogenation, the benzene charge may be converted to product cyclohexane in substantially stoichiometric yield. The effluent stream from hydrogenation may be substantially pure cyclohexane substantially free of unconverted benzene. In practice of the hydrogenation process of this invention, the product may commonly be obtained in purity above 99.85% and typically in purity of about 99.9%–99.95%. The unhydrogenated benzene present in the product cyclohexane may desirably be less than about 500–1000 ppm (0.05%–0.1%) and commonly it may be possible to obtain product cyclohexane containing less than 60 ppm benzene. The product so obtained may be readily marketed without further treatment or rectification.

It is particularly unexpected to be able to achieve hydrogenation of benzene to high purity cyclohexane in high yield by the use of low (less than about 0.5%) concentrations of platinum or rhodium on the low ash carbon of this invention—it is noted for example that other metals such as palladium on low ash carbon (eg 1% Pd on 0.14% ash) are completely inactive at inlet temperatures up to 500° F.

It will be apparent to those skilled in the art that the particular level of total ash (determined by ignition to 1700° F. in air followed by holding at 1700° F. overnight) will depend upon many factors including the particular charge carbon, its method of preparation and agglomeration, and the degree of treating as herein noted. Also apparent is the fact that the level of ash, silica, and halide in the final agglomerated carbon may be controlled to give levels which are satisfactory for the particular use to which the product is to be put. Typically for example, a charge agglomerated carbon may be that available as the American Norit R-3220 brand of carbon containing eg 3%–10%, say 7.7% total ash of which 50%–100% is typically $SiO_2$ (and the remainder contains oxides of Mg, Na, Ca, Al, and Fe). This latter corresponds to a $SiO_2$ content of ca 2%–10%, typically 5.4%–7.7%, say 6.5%.

After the HCl treatment of the process of this invention, the total ash may be reduced to 1%–15%, say 1%–10%, say 1.3% and the silica content may be 0.5%–9%, typically about 1%–6%, say 1.1%.

After the HF treatment of the process of this invention, the total ash may be reduced to less than about 0.1% and typically 0.05–0.1%. Frequently the total ash and total silica at this point is so low that reliable chemical analyses cannot be obtained.

When it is desired to further treat the agglomerated carbon, which contains halide ion in amount of 0.1%–5% typically 0.1%–2%, say 0.40%, with eg acetic acid as noted, the product may then also be characterized by its halide content of 0.01%–0.5%, typically 0.01%–0.2%, say 0.03%.

Comparable reductions (together with attendant advantages) may be attained with other charge carbons containing substantially lower or higher concentrations of undesirable components.

It is a particular feature of this invention that the strength of the agglomerate commonly remains essentially constant during these procedures; and it may be 0.8–6, preferably 1–6, say 3.1 pounds per mm of length of the cylindrical agglomerates of diameter equal to length or per mm of diameter of spherical agglomerates.

It will be apparent to those skilled in the art that the process of this invention permits attainment of products which are not undesirably characterized by those properties which would be observed if the carbon agglomerates were treated by processes outside the scope of this invention including those using sulfuric acid (which builds up ash), nitric acid (which lowers pellet strength), or with other combinations of acids including hydrochloric acid, hydrofluoric acid, acetic acid etc., singly or in various combinations or orders.

The charge agglomerates (which may also be called pellets, or aggregates) because of the way they are prepared may contain a plurality of generally amorphous carbon entities joined together to form a larger macrostructure. These entities are bonded together as by the residue of the organic matter from which they are formed. In the case of agglomerates formed from sawdust, the initial bonding may be due to the lignins and other high-boiling organic compounds which later decompose to form adhesive bonds of high melting materials. In the case of the additives such as zinc chloride or sodium phosphate, they may melt and react with the organic material and/or decompose to form, on cooling, bridges between the carbon entities. The final agglomerate may include a plurality of amorphous carbon entities bonded together by bridges to form a macrostructure containing up to eg 10% of bonding materials. Thus these agglomerates are substantially different from graphites or carbon powders.

They are particularly characterized by structural integrity under moderate mechanical forces (resulting from weight of the bed of particles, action of fluid passing through the bed, pressure drop across the particles, thermal forces, etc.) so that they retain their shape and size during the course of normal handling such as during catalyst preparation, loading of catalyst into a reactor, use of the catalyst during its use, and discharge from the reactor. They do not break down into a powder which would cause problems of catalyst loss (which is particularly important when noble metals are present) and plugging of catalyst bed or of downstream processing equipment.

DESCRIPTION OF PREFERRED EMBODIMENTS

Practice of the process of this invention may be apparent to those skilled in the art from the following examples wherein, as elsewhere in this specification, all parts, percents, etc. are by weight unless otherwise stated.

EXAMPLES I–III

In this series of examples, charge commercially available activated carbon agglomerates sold by American Norit Co. under the trademark Norit R3230 were employed. These agglomerates were cylinders of irregular length of average diameter of about 3 mm and of average apparent density of about 0.47 g/cc. After calcination 4.3% nonvolatile ash remained which analyzed as follows:

| Component | % |
|---|---|
| $Na_2O$ | 5 |
| MgO | 20 |
| CaO | 10 |
| $Al_2O_3$ | 10 |
| $Fe_2O_3$ | 1 |
| $PO_4^=$ | 3.5 |
| $SiO_2$ | 50 |
| $TiO_2$ | 0.5 |

The crush strength is 3.1 pounds per millimeter of length.

In control Example I*, 890 parts of carbon are subjected to leaching by immersion in an excess of 6 N aqueous hydrochloric acid at 130° F.–140° F. for 72 hours. The acid is drained and the carbon is water-washed until the wash water is chloride free. The ash content of the carbon is 1.29%. The chloride content of the carbon is 0.45 w %. (All halide analyses are on samples dried at 300° F.) The crush strength of the agglomerates is unchanged.

EXAMPLE II

In this example which represents practice of the process of this invention, the product of Example I is subjected to a series of rinses each in an excess (4 liters) of 2% acetic acid. The chloride content of the carbon, measured after selected rinses, is as noted in the following table:

| Number of Rinses | Chloride Content | |
|---|---|---|
| | % | ppm |
| 3 | 0.28 | 2800 |
| 5 | 0.15 | 1500 |
| 10 | 0.044 | 440 |
| 15 | 0.019 | 190 |

EXAMPLE III

In this example which represents practice of the process of this invention, 1800 parts of carbon agglomerates are subjected to leaching by immersion in an excess of 6 N aqueous hydrochloric acid at 130° F.–140° F. for 72 hours. The acid is drained and the carbon is water-washed until the wash water is chloride free. The chloride content of the carbon is then determined and found to be 0.31% (3100 ppm).

This product is rinsed once with four liters of 20% acetic acid for 72 hours at 130° F.–140° F. and found to contain 760 ppm chloride. After a second rinse with four liters of fresh 20% acetic acid for 72 hours at 130° F.–140° F., the chloride content is found to be 280 ppm.

EXAMPLES IV–XII

In this series of Examples, carbon agglomerates are treated as set forth in the following table; and the ash and chloride and fluoride content determined as shown.

TABLE

| Example | Sample Treatment or Description | Halide Content[a] Weight Percent | | Percent Ash of Sample | Crush Strength lb. |
|---|---|---|---|---|---|
| | | Chloride | Fluoride | | |
| IV* | Norit R-3230 activated carbon | — | — | 7.7 | 22 |
| V* | 400 grams Norit R 3230 contacted with 1500cc 6N HCl for 4 days at 130–140° F. Then thoroughly water washed | 0.21 | — | 5.0 | 22 |
| VI* | Three quarters of Sample V contacted with 10 Wt. % HF solution (1 liter) at 130–140° F. for 24 hours, then water washed | 0.080 | 0.46 | 0.08 | 26 |
| | One quarter of Sample V washed: | | | | |
| VII | Once with 800 cc. of 20% acetic acid solution | 0.15 | — | 4.8 | 28 |
| VIII | Twice with 800 cc. of 20% acetic acid solutions | 0.072 | — | 4.9 | 29 |
| IX | Three times with 800 cc. of 20% acetic acid solutions | 0.047 | — | 4.7 | 20 |
| X | Sample VI washed once with 2400 cc. of 20% acetic acid solution | 0.072 | | 0.06 | |
| XI | Sample VI washed two times with 2400 cc. of 20% acetic acid solutions | 0.043 | | 0.06 | |
| XII | Sample VI washed three times with 2400 cc. of 20% | 0.032 | 0.021 | 0.05 | 27 |

[a] after drying at 300° F.

From the above table, it will be observed that the carbon agglomerate had an initial ash content of 7.7 w % (Ex IV); and this was decreased to 5.0% by one treatment with HCl (Ex V) and thence to 0.08% by a treatment with HF (Ex. VI). The original crush strength was unchanged after treatment with HCl and in fact increased from 22 up to 26 lb after treatment with HF (Ex VI).

Treatment of the HCl-treated agglomerate of Ex V with acetic acid (in Ex VII–XII) desirably decreased the halide content from an initial level of 0.21% down to a final level of as low as 0.047% in Example IX. The crush strength may increase to as high as 29 lbs (Ex VIII) an unexpected increase to 29/22 or 132% of that of the charge.

In the preferred embodiment of Example XII (wherein the charge carbon of Example IV was washed first in HCl (Ex V), then in HF (Ex VI), then in acetic acid (Ex XII), the final ash content is only 0.05, the final chloride content is 0.032%, the final fluoride content is 0.021%, and the final crush strength is 27 lbs—an increase to 27/22, 123% of that of the charge carbon of Example IV.

EXAMPLE XIII*

In this control example, an activated carbon agglomerate containing 4.3% ash is contacted with 6 N aqueous nitric acid for two days at 130° F.–140° F. After thorough washing and drying in a stream of nitrogen, the carbon contains 1.48% ash and no halides.

The crush strength is found to be reduced from an initial value of 18 down to a final value of 7.6 pounds. A loss of this magnitude renders this control technique unacceptable.

EXAMPLE XIV

A charge activated carbon agglomerate has the following properties:

| Property | Value |
|---|---|
| Dimension | 3 mm × 3 mm cylinder |
| Ash content (total) | 7.7% |
| Silica content | 6.5% |
| Chloride Content | Ca 0% |
| Fluoride Content | ca 0 |
| Strength | 3.1 lbs/mm |

This carbon agglomerate is treated for 24 hours with four times its weight of 6 N aqueous hydrochloric acid then after draining and washing with four times its weight of 10% aqueous hydrofluoric acid, and then after draining and washing with four times its weight of acetic acid—all the steps being carried out at essentially 130° F.–140° F.

The final agglomerate may have the following properties:

| Property | Value |
|---|---|
| Ash Content total | 0.09% |
| Silica Content | 0.08% |
| Chloride Content | 175 ppm |
| Fluoride Content | 0.1% |
| Strength | 3.1 lbs./mm |

This low ash, low halide, activated carbon agglomerate is contacted for 24 hours at 130° F.–140° F. with an aqueous solution (containing 50 g/l platinum) of ammonium chloroplatinate. Drying at 212° F., followed by heating to 700° F. in a stream of hydrogen yields catalyst containing 1.03% platinum.

This catalyst may be used in the hydrogenation of benzene to cyclohexane at 500 psig, 4 LHSV, 3:1 volume ratio of cyclohexane to benzene in the feed at temperature of 300° F. After equilibrium is reached, it is found that a product stream is recovered which contains no benzene and which is substantially pure cyclohexane.

It may be found that generally comparable results are obtained if the following hydrohalic acid solutions are used (prior to leaching with organic carboxylic acid, such as acetic acid).

| EXAMPLE | SOLUTION |
|---|---|
| XV | 3N aq. HCl |
| XVI | 3N aq. HCl plus 3N aq. HBr |
| XVII | 6N aq. HCl plus 3N aq. HF |
| XVIII | 3N aq. HF |

Although HCl alone or HF alone may be employed (as in Examples XV and XVIII) or mixtures of eg HCl and HBr, HCl and HF (as in Examples XVI and XVII), it is found that outstanding superior results may be achieved by use of HCl followed by HF (and thereafter with acetic acid) as eg in Example III.

Results comparable to those of experimental example III for example may also be attained if the acetic acid solution be replaced by a comparable solution containing:

| Example | Composition |
|---|---|
| XIX | ammonium acetate |
| XX | ammonium benzoate |
| XXI | ammonium carbamate |
| XXII | ammonium citrate |
| XXIII | ammonium oxalate |
| XXIV | ammonium salicylate |
| XXV | tetramethylammonium acetate |
| XXVI | ammonium carbonate |
| XXVII | ammonium bicarbonate etc. |

EXAMPLE XXVIII

In this experimental example, the charge carbon agglomerate of Example III is treated for 24 hours at 130° F.–140° F. with a single aqueous solution containing 10% HF and 20% HCl. After subsequent water-washing, the carbon may be found to contain 0.4% chloride 0.5% fluoride, and 1.3% ash. In a second step, the carbon (after draining and water washing) is contacted for 24 hours at 130° F.–140° F. with an aqueous solution containing 200 g per liter of ammonium formate to yield a product carbon agglomerate of substantially the same strength as the charge agglomerate, and containing less than 0.1% chloride, 0.2 fluoride, and 0.4% ash.

Although this invention has been illustrated by reference to specific embodiments, it will be apparent to those skilled in the art that various changes and modifications may be made which clearly fall within the scope of this invention.

We claim:

1. The method of preparing a reduced ash carbon agglomerate which comprises
   leaching a high ash carbon agglomerate in contact with a hydrohalic acid thereby forming a reduced ash carbon agglomerate containing halide values;
   leaching said reduced ash carbon agglomerate in contact with a solution containing at least one composition selected from the group consisting of water-soluble organic carboxylic acid and ammonium salts thereof thereby forming a reduced ash carbon agglomerate containing decreased halide values; and
   recovering said reduced ash carbon agglomerate containing decreased halide values.

2. The method of preparing a reduced ash carbon agglomerate as claimed in claim 1 wherein said hydrohalic acid is hydrochloric acid.

3. The method of preparing a reduced ash carbon agglomerate as claimed in claim 1 wherein said hydrohalic acid is hydrofluoric acid.

4. The method of preparing a reduced ash carbon agglomerate as claimed in claim 1 wherein said reduced ash carbon agglomerate contains 1%–15% halide values.

5. The method of preparing a reduced ash carbon agglomerate as claimed in claim 1 wherein said water-soluble organic carboxylic acid is formic acid, acetic acid, propionic acid, butyric acid, or oxalic acid.

6. The method of preparing a reduced ash carbon agglomerate as claimed in claim 1 wherein said composition is acetic acid.

7. The method of preparing a reduced ash carbon agglomerate as claimed in claim 1 wherein said composition is ammonium acetate.

8. The method of preparing a reduced ash carbon agglomerate which comprises leaching a high ash carbon agglomerate with hydrochloric acid thereby forming a reduced ash carbon agglomerate containing chloride values;

leaching said reduced ash carbon agglomerate in contact with an aqueous solution of acetic acid thereby forming a reduced ash carbon agglomerate containing decreased chloride values; and recovering said reduced ash carbon agglomerate containing decreased chloride values.

* * * * *

UNITED STATES PATENT AND TRADEMARK OFFICE
CERTIFICATE OF CORRECTION

PATENT NO. : 4,415,478

DATED : November 15, 1983

INVENTOR(S) : Dr. Robert M. Suggitt et al

It is certified that error appears in the above—identified patent and that said Letters Patent is hereby corrected as shown below:

Column 6, line 8, after "1200°F",
insert --, preferably 800°F-1000°F --;

Column 6, line 38, correct the spelling of "platinum",

Signed and Sealed this

Twenty-eighth Day of February 1984

[SEAL]

Attest:

GERALD J. MOSSINGHOFF

Attesting Officer

Commissioner of Patents and Trademarks